(12) United States Patent
Masuda

(10) Patent No.: US 7,198,666 B2
(45) Date of Patent: Apr. 3, 2007

(54) JOINTING MATERIAL COMPRISING A MIXTURE OF BORON OXIDE AND ALUMINUM OXIDE AND METHOD OF JOINTING UTILIZING SAID JOINTING MATERIAL

(75) Inventor: Takashi Masuda, Tokyo (JP)

(73) Assignee: Yamatake Corporation, Tokyo (JP)

( * ) Notice: Subject to any disclaimer, the term of this patent is extended or adjusted under 35 U.S.C. 154(b) by 526 days.

(21) Appl. No.: 10/415,238

(22) PCT Filed: Oct. 25, 2001

(86) PCT No.: PCT/JP01/09397

§ 371 (c)(1),
(2), (4) Date: Sep. 15, 2003

(87) PCT Pub. No.: WO02/36521

PCT Pub. Date: May 10, 2002

(65) Prior Publication Data

US 2004/0026485 A1   Feb. 12, 2004

(30) Foreign Application Priority Data

Oct. 27, 2000 (JP) .............................. 2000-328330

(51) Int. Cl.
*C09D 1/00* (2006.01)
*B05D 3/02* (2006.01)

(52) U.S. Cl. .............................. 106/286.1; 106/286.8; 106/287.17; 427/383.5; 427/419.3

(58) Field of Classification Search ................ 427/402, 427/207.1, 208.2, 372.2, 419.1, 419.2, 419.3, 427/380, 383.5; 228/203; 156/60, 314; 106/286.1, 286.5, 286.8, 287.17

See application file for complete search history.

(56) References Cited

U.S. PATENT DOCUMENTS

6,012,303 A    1/2000   Axelson et al.

FOREIGN PATENT DOCUMENTS

| JP | 58005157    | 1/1983  |
|----|-------------|---------|
| JP | 58-69784    | 4/1983  |
| JP | 59088851    | 5/1984  |
| JP | 59-112133   | 7/1984  |
| JP | 59-141464   | 8/1984  |
| JP | 61-10736    | 1/1986  |
| JP | 61-270267   | 11/1986 |
| JP | 03068829    | 3/1991  |
| JP | 4-187571    | 7/1992  |
| JP | 4-275984    | 10/1992 |
| JP | 5-170479    | 7/1993  |
| JP | 06-071184   | 3/1994  |
| JP | 2000-143361 | 5/2000  |

*Primary Examiner*—William Phillip Fletcher, III
(74) *Attorney, Agent, or Firm*—Blakely Sokoloff Taylor & Zafman

(57) ABSTRACT

A coating film is formed on a substrate of sapphire by coating the substrate with a jointing material prepared by dissolving $Al(OC_2H_5)_3$ and $B(OCH_3)_3$ into xylene. Subsequently, the substrate is heated to about 450 °C. and the coating film is irradiated with, e.g., ultraviolet radiation having a wavelength of 172 nm. Thus, xylene in the coating film is vaporized, and $Al(OC_2H_5)_3$ and $B(OCH_3)_3$ are thermally decomposed to form a jointing material composed of amorphous or γ-layer alumina ($Al_2O_3$) and amorphous boron oxide ($B_2O_3$).

8 Claims, 1 Drawing Sheet

JOINTING MATERIAL COMPRISING A MIXTURE OF BORON OXIDE AND ALUMINUM OXIDE AND METHOD OF JOINTING UTILIZING SAID JOINTING MATERIAL

The present patent application is a non-provisional application of International Application No. PCT/JP01/09397, filed Oct. 25, 2001.

BACKGROUND OF THE INVENTION

The present invention relates to a jointing material made of a metal oxide and, more particularly, to a jointing material and joining method of joining a metal oxide such as sapphire with another member.

A capacitive pressure sensor chip is available which detects a pressure by detecting an electrostatic capacitance. The housing of the pressure sensor chip is constituted by a base body having a predetermined space and a diaphragm arranged on the space of the base body. The pressure sensor chip has a stationary electrode arranged on the base body and a movable electrode fixed to the diaphragm. When the diaphragm deforms upon reception of a pressure, the distance between the movable electrode and stationary electrode changes, so the electrostatic capacitance between the movable and stationary electrodes changes. The pressure received by the diaphragm can be measured on the basis of the change in electrostatic capacitance.

As such a pressure sensor chip, one in which the base body and diaphragm which constitute the housing are made of sapphire is proposed. Sapphire, i.e., corundum (aluminum oxide, α phase), is thermally very stable, hardly dissolves in an acid or alkali, and has wide applications such as in a refractory, insulator, and abrasive. When sapphire having such properties is used to form the housing, even if the measurement target is a corrosive fluid, the pressure of the fluid can be measured by receiving the fluid with the diaphragm directly.

The above pressure sensor chip is fixed to a base as shown in FIG. 5, and is used as a pressure sensor. As shown in FIG. 5, a chip 501 in the pressure sensor is placed in a recess 503 formed at the center of a base 502 made of, e.g., glass, such that its diaphragm portion faces up in FIG. 5. Terminals 505 of electrode pins 504 extending through the bottom surface of the base 502 are present in the bottom surface of the recess 503 of the base 502, and are connected to the interconnections of the respective electrodes extended to the rear surface of the base of the chip 501. A vent hole 506 communicating with the bottom surface of base 502 is formed in the bottom surface of the recess 503.

The chip 501 is pressed at the peripheral portion of its upper surface by a cover plate 507 having an opening at its center, and is fixed to the recess 503. The cover plate 507 is joined to the upper surface of the base 502 with glass which is fused once, so that it is fixed to the base 502. The abutting portions of the cover plate 507 and chip 501 are connected hermetically so the measurement target fluid which is to come into contact with the upper surface of the chip 501 does not enter the recess 503 around the chip 501.

The cover plate 507 is made of sapphire which is the same material as that of the chip 501, in order that the precision of pressure measurement is secured and that deformation of the chip 501 by the temperature becomes identical, thus causing no stress in the chip 501. The abutting surfaces of the cover plate 507 and chip 501 are joined by direct joining in order to eliminate hetero-joining, so that the hermetic state described above can be obtained. In this sapphire joining, the two joining surfaces are mirror-polished and abutted against each other. Pressure is applied across the two sapphire members to be joined, and the sapphire members are heated. Thus, a firm joining state can be obtained without using any jointing material or the like.

In above direct joining, as the abutting surfaces of the two sapphire members must be mirror-polished until their surface roughnesses become 0.3 nm or less, the member (cover plate) becomes very expensive. If a generally available jointing material or the like is used, the joining surfaces need not be mirror-polished. However, as a different material is present between the joining surfaces, a stress may occur, or the joining portions cannot have corrosion resistance or thermal stability equivalent to those of sapphire. Then, the applications are limited.

As described above, conventionally, when a component is to be formed by joining two or more members made of a metal oxide such as sapphire, to exhibit 100% the properties of the material that forms the members, the members are joined to each other by direct joining. However, direct joining is costly. In view of this, when the members are to be joined to each other by utilizing a conventionally available jointing material, a component can be formed at a low cost, but the properties of the material that forms the members cannot be utilized 100%.

SUMMARY OF THE INVENTION

The present invention has been made to solve the problems described above, and has as its object to enable members made of a metal oxide such as sapphire to be joined to each other at a low cost without impairing the characteristics of the members.

A jointing material according to one aspect of the present invention comprises a mixture of boron oxide and intermediate-phase aluminum oxide which is more unstable than α-phase aluminum oxide and which tends to change to a lower energy level.

According to this jointing material, when it is heated to a melting point or more of boron oxide, it forms a mixture of aluminum oxide and $Al_{18}B_4O_{33}$.

A jointing material according to another aspect of the present invention comprises aluminum oxide and $Al_{18}B_4O_{33}$.

According to this jointing material, it has a heat resistance of 1,000° C. or more.

A joining method according to one aspect of the present invention comprises the first step of forming, on a joining surface of a base body of a metal oxide, a solution layer formed of a solution in which a first compound containing aluminum and oxygen and a second compound containing boron and oxide dissolve, the second step of heating the solution layer so that the first compound forms intermediate-phase aluminum oxide which is more unstable than α-phase aluminum oxide and which tends to change to a lower energy level, that the second compound forms boron oxide, and that a joining layer formed of a jointing material containing intermediate-phase aluminum oxide and boron oxide is formed on the joining surface of the base body, and the third step of arranging another member on the joining layer and heating the joining layer to not less than a melting point of boron oxide for a predetermined period of time.

According to this joining method, the jointing material of the joining layer forms a mixture of aluminum oxide and $Al_{18}B_4O_{33}$ through the third step, thus joining the base body and another member.

In the above joining method, the metal oxide is α-phase aluminum oxide. It suffices if the first compound is an organic metal compound of aluminum, and the second compound is an organic metal compound of boron such as an alkoxide. Alternatively, the first compound can be an aluminum hydroxide such as boehmite, and the second compound can be boric acid. Intermediate-phase aluminum oxide may be any one or a mixture of γ phase, θ phase, ι phase, κ phase, ε phase, χ phase, δ phase, and σ phase, or in an amorphous state.

DETAILED DESCRIPTION OF THE EMBODIMENT

The embodiment of the present invention will be described with reference to the drawings.

<First Embodiment>

Figure 1:
FIG. 1 is a view showing a step for explaining a joining method according to an embodiment of the present invention.

FIG. 1 is a view showing a step for explaining a joining method according to an embodiment of the present invention. This embodiment will be explained by way of a case in which sapphire substrates are to be joined to each other.

First, as shown in FIG. 1, a coating film 102 is formed on a substrate 101 of sapphire by coating the substrate with a jointing material prepared by dissolving $Al(OC_2H_5)_3$ and $B(OCH_3)_3$ into xylene. Subsequently, the substrate 101 is heated to about 450° C. and the coating film 102 is irradiated with, e.g., ultraviolet radiation having a wavelength of 172 nm. Thus, xylene in the coating film 102 is vaporized, and $Al(OC_2H_5)_3$ and $B(OCH_3)_3$ are thermally decomposed.

Figure 2:
FIG. 2 is a view showing a step which follows FIG. 1 to explain the joining method.
Figure 3:
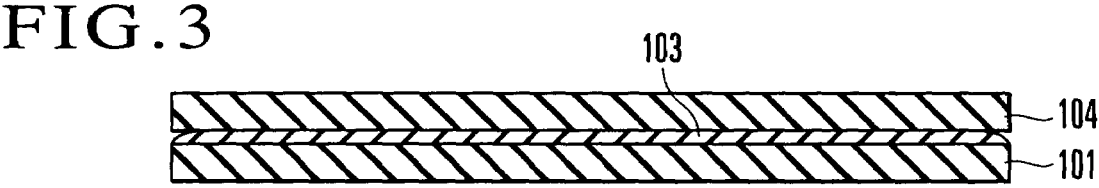
FIG. 3 is a view showing a step which follows FIG. 2 to explain the joining method.

Hence, a joining layer 103 made of a jointing material composed of amorphous or γ-layer alumina ($Al_2O_3$) and amorphous boron oxide ($B_2O_3$) is formed on the substrate 101 (FIG. 2). The heating temperature is lower than 470° C., which is the melting point of boron oxide.

The surface of the joining layer 103 formed by coating with the solution described above is flat as it absorbs steps on the surface of the substrate 101. Part of alumina in the joining layer 103 formed by thermal decomposition is joined to the surface of the substrate 101 of sapphire.

As alumina has a corundum type crystal structure (α phase), it forms sapphire or the like which is very stable as corundum. In contrast to this, γ-alumina having a cubic system spinel type crystal structure has many lattice defects in which oxygen atoms lack because, e.g., the crystal structure is unnatural. In amorphous alumina, many lattice defects exist. When a layer having many lattice defects in which oxygen atoms lack is formed on a metal oxide crystal body such as sapphire in this manner, oxygen on the surface enters the lattice defects to try to create a stable state. Thus, the substrate 101 and the joining layer 103 formed on its surface are chemically bonded and joined to each other.

Figure 4:
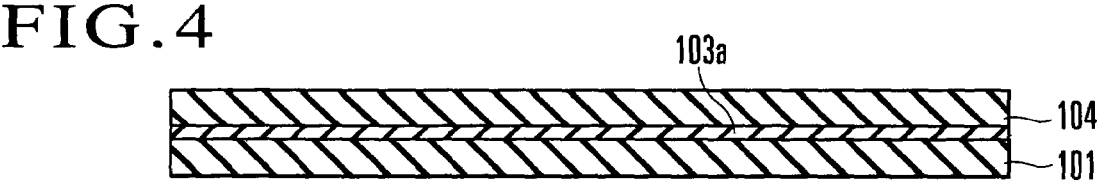
FIG. 4 is a view showing a step which follows FIG. 3 to explain the joining method.
Figure 5:
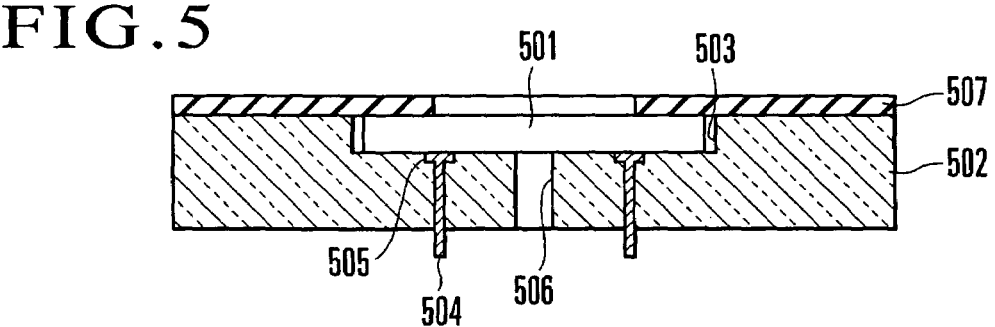
FIG. 5 is a view showing the arrangement of a pressure sensor.

A new substrate 104 of sapphire is prepared as shown in FIG. 4. The substrate 104 is placed on the joining layer 103 on the substrate 101. The resultant structure is heated to 470° C. or more, e.g., 480° C. This heating temperature should be equal to or higher than a temperature at which boron oxide fuses. At about 480° C., an equilibrium state is obtained where γ-alumina does not fuse at all but partly dissolves in boron oxide which has dissolved to form a liquid. In other words, in the joining layer 103, γ-alumina partly dissolves in liquefied boron oxide.

In this state, boron oxide which has fused to form liquid and γ-alumina which dissolves in it react with each other to form $Al_2B_2O_6$.

At the heating state at 480° C., as the temperature is equal to or higher than the melting point of $Al_2B_2O_6$, $Al_2B_2O_6$ fuses to form a liquid. Then, remaining γ-alumina partly dissolves in and reacts with fused $Al_2B_2O_6$, thus forming $Al_4B_2O_9$. As $Al_4B_2O_9$ fuses at 480° C., remaining γ-alumina successively partly dissolves in and reacts with molten $Al_4B_2O_9$ liquid to form $Al_{18}B_4O_{33}$ finally. As $Al_{18}B_4O_{33}$ has a melting point of 1,950° C., it does not dissolve when it is heated to 480° C., but forms a solid.

Therefore, when the joining layer 103 is held heated at 480° C., its boron oxide portion fuses in the initial stage. Fused boron oxide and alumina chemically react with each other to form $Al_{18}B_4O_{33}$ having a melting point of 1,950° C. As a result, as shown in FIG. 4, the substrate 101 and substrate 104 are firmly joined to each other through a joining layer 103a of alumina and $Al_8B_4O_{33}$. The joining layer 103a is thermally very stable, and hardly dissolves in an acid or alkali, which are characteristics similar to those of sapphire.

In the above description, $Al(OC_2H_5)_3$ and $B(OCH_3)_3$ are used, but the present invention is not limited to them. For example, when an aluminum hydroxide such as boehmite sol and boric acid are used, if a coating film formed by dissolving them is heated, a joining layer 103 made of a jointing material composed of amorphous or γ-layer alumina ($Al_2O_3$) and amorphous boron oxide ($B_2O_3$) can be formed on the substrate 101.

As has been described above, according to the present invention, a plate member of sapphire can be joined to a pressure sensor chip of sapphire in the same state as direct joining. An excellent effect can thus be obtained in which a pressure sensor made of sapphire can be formed at a low cost without impairing the properties of sapphire.

As described above, the jointing material and joining method according to the present invention are suitable when members made of a metal oxide such as sapphire are to be joined to each other at a low cost without impairing the characteristics of the members.

The invention claimed is:

1. A jointing material comprising a mixture of boron oxide and intermediate-phase aluminum oxide which has more oxygen-deficient lattice defects than α-phase aluminum oxide.

2. A joining method characterized by comprising
   the first step of forming, on a joining surface of a base body of a metal oxide, a solution layer formed of a solution in which a first compound containing aluminum and oxygen and a second compound containing boron and oxide dissolve,
   the second step of heating the solution layer so that the first compound forms intermediate-phase aluminum oxide in state where more oxygen-deficient lattice defects exist than α-phase aluminum oxide, that the second compound forms boron oxide, and that a joining layer formed of a jointing material containing intermediate-phase aluminum oxide and boron oxide is formed on the joining surface of the base body, and the third step of arranging another member on the joining layer and heating the joining layer to not less than a temperature which is a melting point of boron oxide for a predetermined period of time.

3. A joining method according to claim 2, characterized in that the metal oxide is α-phase aluminum oxide.

4. A joining method according to claim 2, characterized in that the first compound is an organic metal compound of aluminum and the second compound is an organic metal compound of boron.

5. A joining method according to claim 4, characterized in that the second compound is boron alkoxide.

6. A joining method according to claim 2, characterized in that the first compound is an aluminum hydroxide, and the second compound is boric acid.

7. A joining method according to claim 6, characterized in that the first compound comprises boehmite.

8. A joining method according to claim 2, characterized in that intermediate-phase aluminum oxide is any one or a mixture of γ phase, θ phase, ι phase, κ phase, ε phase, χ phase, δ phase, and σ phase, or in an amorphous state.

* * * * *